July 30, 1968   J. G. FONTAINE   3,395,315
TRANSISTOR INVERTER CIRCUIT FOR GAS-FILLED ILLUMINATING MEANS
Filed Sept. 30, 1966
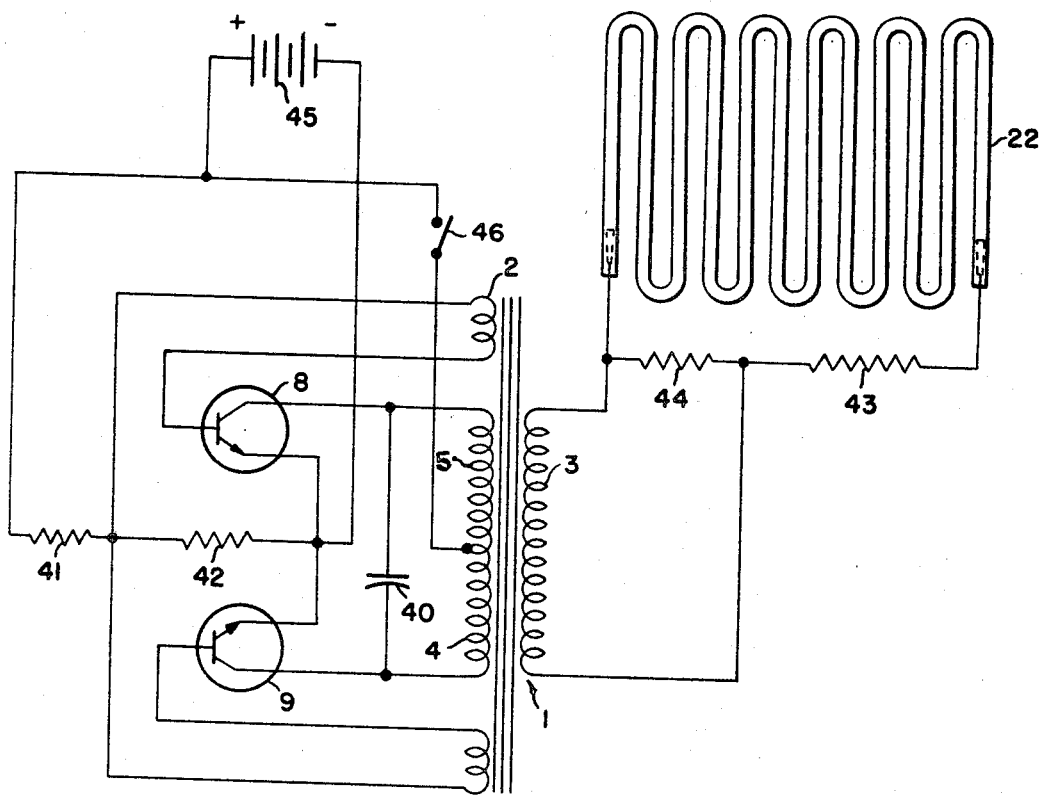
INVENTOR.
JOHN G. FONTAINE
BY
ATTORNEY 3,395,315
TRANSISTOR INVERTER CIRCUIT FOR GAS-FILLED ILLUMINATING MEANS
John G. Fontaine, Fort Lauderdale, Fla., assignor to Automatic Displays, Inc., Fort Lauderdale, Fla., a corporation of Florida
Filed Sept. 30, 1966, Ser. No. 583,361
2 Claims. (Cl. 315—246)

ABSTRACT OF THE DISCLOSURE

A transistor inverter circuit for driving a gas filled illuminator tube, the circuit including a transformer having a secondary winding across which is connected a shunting resistor, the tube and a series resistor also being connected across the secondary winding for presenting a matched load thereto.

---

This invention relates to illuminating means that would produce a highly condensed light or panel of light from a DC source.

In many places where DC power is available and where light is required such as on buses, trains, trucks, boats, among other things, this particular illuminating means would find a wide application.

The present invention illustrates a circuit diagram together with electronic and/or electrical components showing an arrangement for illuminating a gaseous illuminator or tube such as can be used behind transparent signs, pictures, stationary or moving advertising panels.

An object of the invention is to provide a highly reliable inverter and illuminating means that will not fail due to an extreme variation in DC voltage or current.

Still another object of the invention is to provide an illuminating means that will not destroy itself from over heat or burn out due to a disconnection or a dead short across the electrodes.

Still another object of the invention is to provide an illuminator means that requires no warm up and consequently can be instantly started and stopped at will.

In the drawings, there is shown at 1, a transformer designed to operate at any convenient frequency and power level depending upon the requirements of the system. The transformer shown includes a primary winding 2, a secondary winding 3, and two feed back windings 4 and 5.

At 22 is shown a gas-filled illuminator of known form in which glass tubing bent in various shapes is filled with gas and/or other ionizing matter to produce the desired color and/or kelvin temperature of illumination. Transistors are connected into the circuit as indicated, the same being respectively shown at 8 and 9. These transistors are of a known type and are dictated by the power level and requirements of the system. The capacitor shown at 40, connected across the windings 4 and 5, is a buffer capacitor and is used to reduce transients caused by the commutation of the circuit. Capacitance and voltage levels are selected mainly by the peak-to-peak transient level and the additional current that is caused to be drawn by the transistors.

The resistors shown respectively at 41 and 42 constitute a divider network which provides DC bias for the bases of the transistors. The resistor shown at 43 is a load ballast resistor which is connected in series with the gaseous illuminator 22 to aid in presenting a proper match to the output winding 3 of the transformer 1. The resistor shown at 44 is used as a protective load for the inverter system in the event of failure of the gaseous illuminator 22 or the resistor 43.

The source of DC power is indicated at 45, the main power switch being shown at 46.

The present circuit, when switch 46 is closed, illuminator would operate continuously and the secondary winding 3 together with protective resistor 44 and ballast resistor 43 all connected in series with illuminator 22 has the results in the effect that with once ignited a great variation in DC voltage can be applied, for instance, from 6 volts DC to 28 or 30 volts DC continuously without damaging the inverter as shown in the drawings.

In a number of applications where the inverter system would be applied, such as moving vehicles, it will be subject to considerable vibration and it would not be hard to imagine the unit becoming open circuited or the illuminator being broken. This circuit is especially designed that in the event that the above should happen, resistors 44 and 43 would act as protective elements to protect the components in the circuitry until the condition is repaired. For instance, if the electrodes on the end of illuminator 22 where dead shorted across. The inverter as shown in the schematic would then idle until the short is removed. It can readily be seen that a heavy load would then be presented to the inverter, the value of which it could not drive. It would then cease oscillating and idle the unit until the short is removed. This is a great improvement over ordinary inverters which utilize fluorescent tubes and ballasts for lighting.

From the foregoing, the operation of the disclosed arrangement will be clearly understood. When the switch 46 is closed, one of the transistors 8 or 9 will begin to conduct, blocking the second transistor, and the conducting transistor remains in conducting condition until the frequency determining characteristics of the circuits act to switch off one transistor and switch on the other transistor. When the inverter is switching at its designed frequency, alternating pulses of current are switched through the primary winding 2 of the transformer 1. This alternating switching of current in the primary winding 2 induces an alternating current and voltage in the secondary winding 3 of the transformer. The stepped up voltage and current is applied to the load elements 44, 43 and the illuminator 22. This stepped up voltage is of such value as to cause ionization of the gases in the illuminator 22. The resistor 43, being connected in series with the illuminator 22, provides any additional load resistance necessary to properly match the total load to the secondary winding 3 of the transformer 1. The resistor 44 acts as a protective load to the inverter system should the illuminator 22 become open circuited. The output may be shorted at any time without damage to ay component of the circuit. Shorting of the output merely presents a heavy load to the inverter which it cannot drive and as a result the inverter ceases oscillation and idles until the short is eliminated.

It is to be understood that the invention is not limited to the precise construction shown, but that changes are contemplated as readily fall within the spirit of the invention as shall be determined by the scope of the subjoined claims.

I claim:
1. An illuminator apparatus including in combination a source of DC current, a transformer having primary winding means, secondary winding means and feedback winding means, a pair of transistors each having an emitter-base portion and an emitter-collector portion, means connecting the emitter-base portions of said transistors to said primary winding means for delivering an output thereto, means connecting the emitter-collector portions of said transistors to said feedback winding means, means connecting said source to said transistors to provide operating voltage for alternate conduction of said transistors, said source, primary and feedback winding means, transistors and connecting means forming an inverter circuit wherein one of said transistors conducts while blocking the other of said transistors until the frequency determining characteristics of said inverter circuit act to switch off said one transistor and switch on said other transistor to thereby produce oscillations with alternating current and voltage in said secondary winding means of said transformer, a first resistor and a gas filled illuminator tube connected in series with each other and across said secondary winding means of said transformer, and a second resistor connected across said secondary winding means in parallel with the series combination of said first resistor and tube, said tube having electrodes of a non-filamentary type adapted to ionize the gas in said tube to produce illumination in response to the voltage and current applied thereto by said secondary winding means, said first resistor providing an additional load resistance to properly match the total load to said secondary winding means and acting with said tube such that if the electrodes of said tube are shorted out a heavy load is presented to said inverter circuit causing the same to cease oscillating, and said second resistor providing a protective load for said inverter circuit which protects the inverter circuit in the event said tube becomes open circuited.

2. The illuminator apparatus as claimed in claim 1 and further including capacitor means connected to the collector portions of said transistors to reduce transients caused by the commutation of said inverter circuit.

References Cited

UNITED STATES PATENTS

| 3,008,068 | 11/1961 | Wilting et al. | 315—206 |
| 3,061,797 | 10/1962 | Grenier | 331—114 |

DAVID J. GALVIN, *Primary Examiner.*

UNITED STATES PATENT OFFICE
CERTIFICATE OF CORRECTION

Patent No. 3,395,315                                        July 30, 1968

John G. Fontaine

It is certified that error appears in the above identified patent and that said Letters Patent are hereby corrected as shown below:

Column 1, line 45, and column 2, lines 35 and 36, "2", each occurrence, should read -- 4,5 --. Column 1, line 46, "4 and 5" should read -- 2 --. Column 2, line 64, "base" should read -- collector --; line 66, "collector" should read -- base --.

Signed and sealed this 20th day of January 1970.

(SEAL)
Attest:

Edward M. Fletcher, Jr.                              WILLIAM E. SCHUYLER, JR.
Attesting Officer                                                Commissioner of Patents